(12) United States Patent
Vasudevan et al.

(10) Patent No.: US 12,374,001 B2
(45) Date of Patent: Jul. 29, 2025

(54) METHOD AND SYSTEM FOR GENERATING COLOR VARIANTS FOR FASHION APPARELS

(71) Applicant: Tata Consultancy Services Limited, Mumbai (IN)

(72) Inventors: Bagya Lakshmi Vasudevan, Chennai (IN); Kalyan Prakash Baishya, Pune (IN); Kuruvilla Abraham, New Delhi (IN); Jayavardhana Rama Gubbi Lakshminarasimha, Bangalore (IN); Gaurab Bhattacharya, Bangalore (IN); Nikhil Kilari, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 215 days.

(21) Appl. No.: 18/336,649

(22) Filed: Jun. 16, 2023

(65) Prior Publication Data

US 2023/0410390 A1 Dec. 21, 2023

(30) Foreign Application Priority Data

Jun. 17, 2022 (IN) .............................. 202221034940

(51) Int. Cl.
G06T 11/00 (2006.01)
G06T 7/194 (2017.01)

(52) U.S. Cl.
CPC ............ *G06T 11/001* (2013.01); *G06T 7/194* (2017.01); *G06T 2207/20084* (2013.01)

(58) Field of Classification Search
CPC ......... G06T 11/001; G06T 7/194; G06T 5/60; G06T 2207/20084; G06N 3/02; G06N 3/094; G06V 10/82
See application file for complete search history.

(56) References Cited

U.S. PATENT DOCUMENTS

| 11,727,463 B2* | 8/2023 | Sollami .............. G06Q 30/0631 |
| | | 705/26.7 |
| 2003/0058237 A1* | 3/2003 | Lee .................. G08B 13/19604 |
| | | 348/E7.086 |

(Continued)

OTHER PUBLICATIONS

Xin, John H, et al., "Accurate color synthesis of three-dimensional objects in an image", Date: Jun. 2004, pp. 713-723, Publisher: Journal of the Optical Society of America A, Link: https://www.researchgate.net/publication/8567379_Accurate_color_synthesis_of_three-dimensional_objects_in_an_image.

(Continued)

*Primary Examiner* — Antonio A Caschera
(74) *Attorney, Agent, or Firm* — Finnegan, Henderson, Farabow, Garrett & Dunner, LLP

(57) ABSTRACT

Method and system for generating color variants for fashion apparels by providing a Fashion Apparel Regeneration—Generative Adversarial Network (FAR—GAN) to generate color variants of the fashion apparels. The FAR—GAN utilizes a two-step encoding process to encapsulate both an input image and an edge-map information along with a target color embedding branch to manipulate the color information present in the fashion apparel present in the input image that is to be changed to a desired target color. Furthermore, the color and structural information is disentangled by controlling them using a color consistency loss. The FAR—GAN can be trained end-to-end without incorporating complex multi-step process.

11 Claims, 6 Drawing Sheets

(56) References Cited

U.S. PATENT DOCUMENTS

| | | | |
|---|---|---|---|
| 2022/0343561 A1* | 10/2022 | Aggarwal | G06T 7/90 |
| 2023/0298224 A1* | 9/2023 | Aggarwal | G06F 16/5838 |
| | | | 382/162 |
| 2023/0360294 A1* | 11/2023 | Aggarwal | G06N 3/0475 |
| 2024/0169604 A1* | 5/2024 | Gandelsman | G06T 11/20 |

OTHER PUBLICATIONS

Sun, Shuming et al., "UCCTGAN: Unsupervised Clothing Color Transformation Generative Adversarial Network", Title of the item: 2020 25th International Conference on Pattern Recognition (ICPR), Date: Jan. 10-15, 2021, Publisher: IEEE, Link: https:/ieeexplore.ieee.org/document/9412002.

Kips, Robin et al., "CA-GAN: Weakly Supervised Color Aware GAN for Controllable Makeup Transfer", Title of the item: Computer Vision and Pattern Recognition, Date: Aug. 24, 2020, Publisher: arxiv, Link: https://arxiv.org/abs/2008.10298.

Yildirim, Gokhan et al., "Generating High-Resolution Fashion Model Images Wearing Custom Outfits", Title of the item: 2019 IEEE/CVF International Conference on Computer Vision Workshop (ICCVW), Date: Oct. 27-28, 2019, Publisher: IEEE, Link: https://arxiv.org/pdf/1908.08847.pdf.

\* cited by examiner

200

```
┌─────────────────────────────────────────────┐
│ receiving (a) an input image comprising a fashion apparel,│
│ and (b) a target color to for generating a color variant of the │
│ fashion apparel, wherein the target color is represented in │ ⟵ 202
│ terms of Red Blue Green (RGB) components    │
└─────────────────────────────────────────────┘
                      ↓
┌─────────────────────────────────────────────┐
│ generating a target style embedding of the fashion apparel by │
│ processing the input image via a two-step encoder of a │
│ Fashion Apparel Regeneration-Generative Adversarial │ ⟵ 204
│ Network (FAR-GAN), the two-step encoder comprising (a) a │
│ first level encoder generating a concatenated feature │
│ embedding representing a plurality of primary low-level │
│ features and an edge map of the fashion apparel and (b) a │
│ second level encoder generating the target style embedding │
│ from the concatenated feature embedding     │
└─────────────────────────────────────────────┘
                      ↓
┌─────────────────────────────────────────────┐
│ generating a target color embedding from the RGB │
│ components of the target color via multi-layer Fully │ ⟵ 206
│ Connected (FC) layers of the FAR-GAN        │
└─────────────────────────────────────────────┘
                      ↓
┌─────────────────────────────────────────────┐
│ generating, via a decoder of the FAR-GAN, a synthetic target │
│ image comprising the color variant of the fashion apparel, │
│ wherein the decoder enables dictating of the target style │
│ embedding by the target color embedding using an Adaptive │ ⟵ 208
│ Instance Normalization impose variability and utilizes un- │
│ correlated Gaussian noise added to each of the plurality of │
│ decoder blocks to impose variability in a color and a style of │
│ the fashion apparel in the synthetic target image │
└─────────────────────────────────────────────┘
```

FIG. 2

METHOD AND SYSTEM FOR GENERATING COLOR VARIANTS FOR FASHION APPARELS

PRIORITY CLAIM

This U.S. patent application claims priority under 35 U.S.C. § 119 to: Indian Patent Application No. 202221034940, filed on 17 Jun. 2022. The entire contents of the aforementioned application are incorporated herein by reference.

TECHNICAL FIELD

The embodiments herein generally relate to the field of Neural Network (NN) based image processing and, more particularly, to a method and system for generating color variants for fashion apparels.

BACKGROUND

Color is considered as an important attribute in fashion industry and plays critical role in decisions of customers. Color attracts the attention of viewers with its easily recognizable and distinguishable nature, and effectively leads to actual sales. According to the statistics by Design & Decor Lab, 84.7% customers consider color as the primary reason to buy a product, whereas 62-90% decision on initial viewing is only based on the apparel color. In e-commerce websites, fashion products are mostly depicted with multiple colors to aid this decision-making process. However, the mismatch in color preference can result in direct monetary loss for retailers. Hence, in realistic scenario, the consumers should be given an opportunity to preview the product with the desired color before selecting it for purchase. This leads to increased customer satisfaction and sales, overall improving the growth of retail market. Recently, a surge in deep learning methodologies is witnessed to control different attributes (such as color, texture, etc.) of an image or synthesize new images with changed attributes. Many Generative Adversarial Networks (GANs) have been proposed to synthesize new images, impose variability, control color attribute, and perform image-to image translation. However, existing method rely on complex multistep process such as bounding box generation, segmentation, clustering, and generation methods to achieve the results. Many image-to-image translation methods in literature such as Pix2Pix, StyleGAN, BiCycleGAN, etc. do not possess control on color and have no mechanism check and correct the generated color. Also, the existing methods generate one random color by keeping up the style information, hence there is no guarantee the color at the output of is as intended. Moreover, all these existing methods do not consider disentangling the color and structural information separately and hence possess high chance of getting both the attributes altered while intending to change only the color, evident in HistoGAN proposed in the literature. For example, some existing methods affect the background along with the fashion apparel, which is not a welcome feature for end user trying to compare apparels generated in distinct colors.

SUMMARY

Embodiments of the present disclosure present technological improvements as solutions to one or more of the above-mentioned technical problems recognized by the inventors in conventional systems. For example, in one embodiment, a method for generating color variants for fashion apparels is provided. The method includes receiving (a) an input image comprising a fashion apparel, and (b) a target color for generating a color variant of the fashion apparel, wherein the target color is represented in terms of Red Blue Green (RGB) components. Further, the method includes generating via a two-step encoder of a Fashion Apparel Regeneration—Generative Adversarial Network (FAR-GAN) executed by the one or more hardware processors, a target style embedding of the fashion apparel by processing the input image. The two-step encoder comprises (a) a first level encoder generating a concatenated feature embedding representing a plurality of primary low-level features and an edge map of the fashion apparel and (b) a second level encoder generating the target style embedding from the concatenated feature embedding. Further, the method includes generating a target color embedding from the RGB components of the target color via muti-layer Fully Connected (FC) layers of the FAR-GAN. Furthermore, the method includes generating via a decoder of the FAR-GAN a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen. Further, the method includes a discriminator connected to the decoder to determine whether the synthetic target image is a realistic or a non-realistic image by comparing the synthetic target image with the input image, wherein the FAR-GAN is trained on an adversarial loss to continuously enhance the synthetic target image. Further, the method includes using of a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image.

In another aspect, a system for generating color variants for fashion apparels is provided. The system comprises a memory storing instructions; one or more Input/Output (I/O) interfaces; and one or more hardware processors coupled to the memory via the one or more I/O interfaces, wherein the one or more hardware processors are configured by the instructions to receive (a) an input image comprising a fashion apparel, and (b) a target color for generating a color variant of the fashion apparel, wherein the target color is represented in terms of Red Blue Green (RGB) components. Further, the one or more hardware processors are configured to generate via a two-step encoder of a Fashion Apparel Regeneration—Generative Adversarial Network (FAR-GAN) executed by the one or more hardware processors, a target style embedding of the fashion apparel by processing the input image. The two-step encoder comprises (a) a first level encoder generating a concatenated feature embedding representing a plurality of primary low-level features and an edge map of the fashion apparel and (b) a second level encoder generating the target style embedding from the concatenated feature embedding. Further, the one or more hardware processors are configured to generate a target color embedding from the RGB components of the target color via muti-layer Fully Connected (FC) layers of the FAR-GAN. Furthermore, the one or more hardware processors are configured to generate via a decoder of the FAR-GAN a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen. Further, the one or more hardware processors are configured to utilize a discriminator connected to the decoder to determine whether the synthetic target image is a realistic or a non-realistic image by comparing the synthetic target image with the input image, wherein the FAR-GAN is trained on an adversarial loss to continuously enhance the synthetic target image. Further, the one or more hardware processors are configured to utilize a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image. In yet another aspect, there are provided one or more non-transitory machine-readable information storage mediums comprising one or more instructions, which when executed by one or more hardware processors causes a method for generating color variants for fashion apparels. The method includes receiving (a) an input image comprising a fashion apparel, and (b) a target color for generating a color variant of the fashion apparel, wherein the target color is represented in terms of Red Blue Green (RGB) components. Further, the method includes generating via a two-step encoder of a Fashion Apparel Regeneration—Generative Adversarial Network (FAR-GAN) executed by the one or more hardware processors, a target style embedding of the fashion apparel by processing the input image. The two-step encoder comprises (a) a first level encoder generating a concatenated feature embedding representing a plurality of primary low-level features and an edge map of the fashion apparel and (b) a second level encoder generating the target style embedding from the concatenated feature embedding. Further, the method includes generating a target color embedding from the RGB components of the target color via muti-layer Fully Connected (FC) layers of the FAR-GAN. Furthermore, the method includes generating via a decoder of the FAR-GAN a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen. Further, the method includes a discriminator connected to the decoder to determine whether the synthetic target image is a realistic or a non-realistic image by comparing the synthetic target image with the input image, wherein the FAR-GAN is trained on an adversarial loss to continuously enhance the synthetic target image. Further, the method includes using of a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for generating the color variants for the fashion apparels, using the system of FIG. 1B, in accordance with some embodiments of the present disclosure.

Figure 1A:
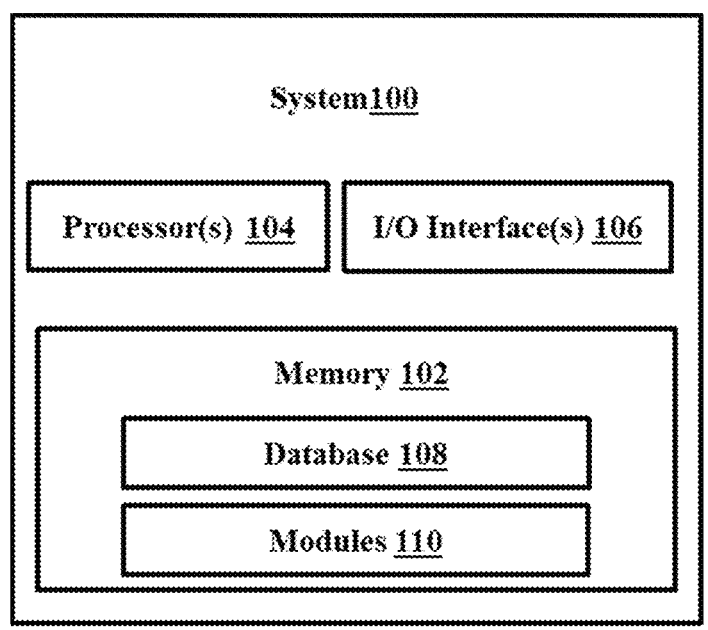
FIG. 1A is a functional block diagram of a system, for generating color variants for fashion apparels, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

State of the art techniques have technical limitations in providing control over a target color while generating color variants of fashion apparels in an image. Most existing techniques change other parameters of the received image, such as the background, along with color change of a fashion apparel, interchangeably referred to as apparel. Further, existing techniques use complex systems requiring multiple modules and multiple steps such as bounding box generation, segmentation, clustering, and generation methods to achieve color change. Increased complexity of any system is bound to increase the processing time for generating output, which is not recommended specifically for customer centric systems. Furthermore, the existing mechanisms hardly have any mechanism provided to control the generated color such that the expected output color closely matches to the input intended color provided by an end user or customer.

For fashion apparels, color regeneration for an output image should be the subject of color manipulation without altering its structural information which is result of style of the apparel and type of clothing material used for the apparel. To alter the color of fashion apparels without changing the shape of the product, it is crucial to obtain the edge information along with the color information. However, mostly the image-to-image translation methods in the literature do not consider edge information that captures the style of the fashion apparel. Few works in the art attempt to consider edge information but do not provide control on color, while few works in the art focus only on the apparel or product outline which loses details of the product. It is well understood that if style details are lost, during color regeneration deformity get introduced and possibility that regenerated image appears non-realistic (fake). Such outcomes are not intended specifically in a fashion retail industry. Realistic look of an apparel or product is one of the most crucial parameters for an end user or customer interested in buying an apparel after viewing it online and expecting the same look and feel when personally and physically experiencing the product on delivery of the product.

Embodiments of the present disclosure provide a method and system for generating color variants for fashion apparels by providing a Fashion Apparel Regeneration—Generative Adversarial Network (FAR-GAN) to generate color variants of the fashion apparels. The FAR-GAN utilizes a two-step encoding process to encapsulate both an input image and an edge-map information along with a target color embedding branch to manipulate or control the color information present in the fashion apparel present in the input image that is to be changed to a desired target color. Furthermore, the color and structural information is disentangled by controlling them using a color consistency loss. The disentanglement approach utilized by the method disclosed provides a technique to separately deal with the color information and the structural or style information such that the structural information does not change while changing the color information. The FAR-GAN can be trained end-to-end without incorporating complex multi-step process. The FAR-GAN provides an integrated Neural network (NN) architecture that has reduced complexity while providing color control and hence consume lesser processing time to generate output, effectively enhancing customer satisfaction specifically in customer centric interactive system.

Some state of the art works such as UCCTGAN: Unsupervised Clothing Color Transformation Generative Adversarial Network by Shuming Sun, Xiaoqiang Li and Jide Li also refer to color loss, however, the loss function used in the considers the color moment of the distribution of the target and generated images and considers other parameters such as skewness, the method disclosed addresses color control enabling a mechanism to reduce the difference between the target color and the dominant mean color of the generated images providing color variants of the fashion apparel in the input image.

Referring now to the drawings, and more particularly to FIGS. 1A through 5, where similar reference characters denote corresponding features consistently throughout the figures, there are shown preferred embodiments and these embodiments are described in the context of the following exemplary system and/or method.

FIG. 1A is a functional block diagram of a system 100, for generating color variants for fashion apparels, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110. The plurality of modules 110 include programs or coded instructions that supplement applications or functions performed by the system 100 for executing different steps involved in the process of generation of color variants, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 may include computer-readable instructions that supplement applications or functions performed by the system 100.

The plurality of modules 110 can include various submodules such components of the FAR-GAN, which include a two-step encoder comprising (a) a first level encoder and (b) a second level encoder, a decoder, a block for generating a target color embedding of a target color, a block for color consistency loss, and a discriminator for determining whether a synthetic target image generated by the FAR-GAN is a realistic or a non-realistic image (fake image). The integrated NN architecture of the FAR-GAN depicting the architectural overview of the system 100 is shown in FIG. 1B and explained in conjunction with a flow diagram depicted in FIG. 2.

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules 110. Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to architecture of the system 100 depicted in FIG. 1B, steps in flow diagrams in FIG. 2 and examples and experimental results depicted in FIGS. 3 through 5.

Figure 1B:
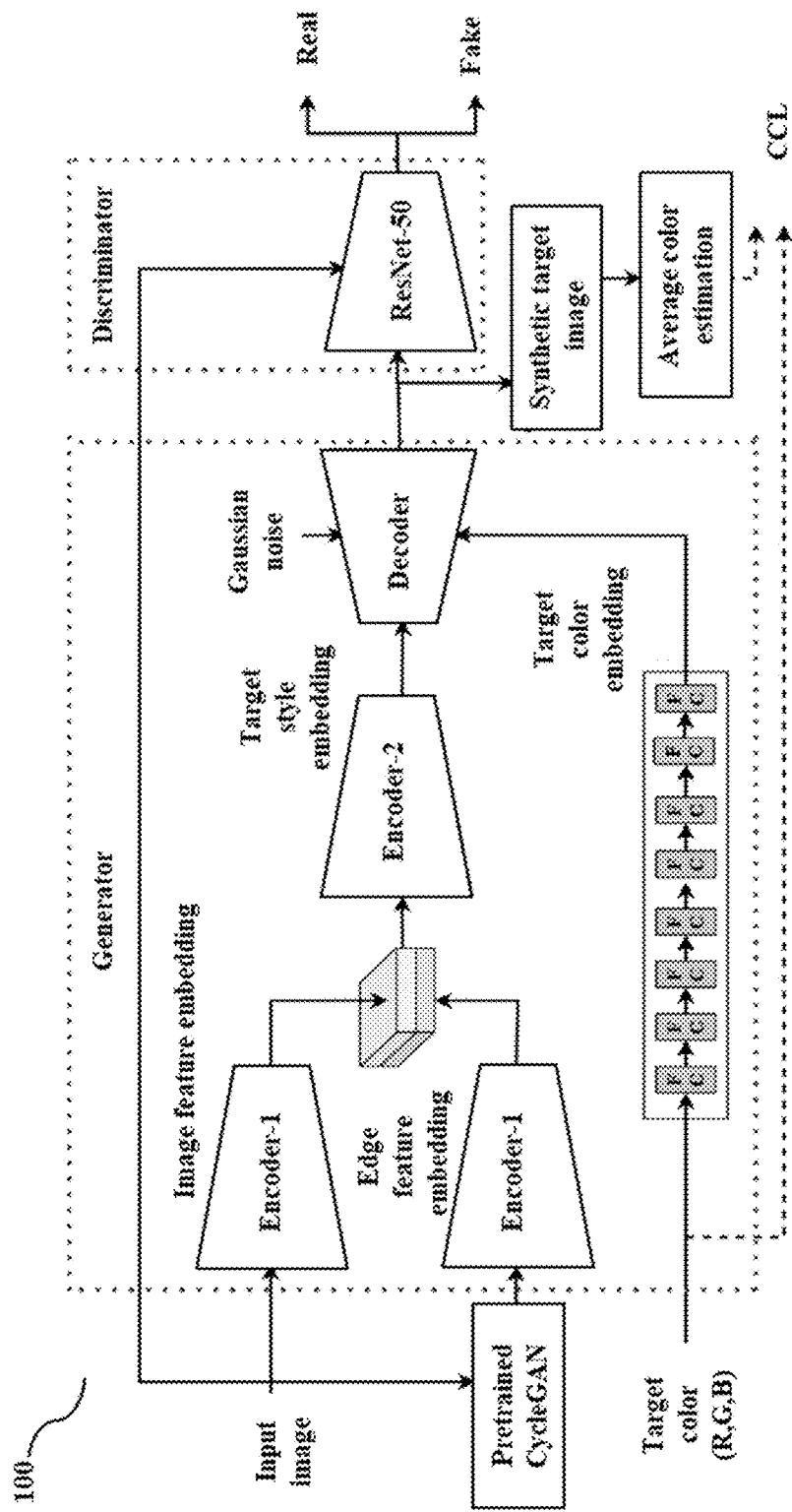
FIG. 1B illustrates an architectural overview of the system of FIG. 1, in accordance with some embodiments of the present disclosure.

FIG. 2 is a flow diagram illustrating a method 200 for generating the color variants for the fashion apparels using the system of FIG. 1B, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1A, 1B and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104 receive (a) the input image comprising a fashion apparel, and (b) a target color for generating a color variant of the fashion apparel. The target color is represented in terms of Red Blue Green (RGB) components. In an example implementation, an end user interested in color change of the apparel can specify or select a color as the target color and the system 100 generates corresponding RGB components for the selected color.

At step 204 of the method 200, the one or more hardware processors 104 generate a target style embedding of the fashion apparel by processing the input image via the two-step encoder of the FAR-GAN. The two-step encoder comprises: (a) the first level encoder generating a concatenated feature embedding representing a plurality of primary low-level features and an edge map of the fashion apparel, and (b) the second level encoder generating the target style embedding from the concatenated feature embedding. The generation of the target style embedding is explained in conjunction with steps below.

On receiving the input image, the plurality of primary low-level features of the fashion apparel are extracted via a first encoder of the first level encoder to generate an image feature embedding. In an embodiment, if the input image comprises a cluttered background, a segmentation process is applied on the input image to detect the object (fashion apparel) from the input image prior to processing the input image by the first level encoder. Thereafter, the edge map of the fashion apparel is generated via a pre-trained Cycle GAN known in the art. For example, the pre-training is performed over publicly available Zalando dataset. From the edge map, an edge feature embedding is generated via the second encoder of the first level encoder. The image feature embedding captures several aspects of the fashion apparel image, such as style, texture, color, pattern, etc. However, for structural similarity, obtaining the edge information is very crucial which also aids proper creation of style, pleats, and pattern. Hence, the method disclosed herein applies both embeddings to enrich the overall information. Thus, the image feature captures the overall fashion apparel understanding and edge feature explicitly captures the structural information. The NN design of the first level encoder (Encoder-1) and the second level encoder (Encoder-2) is provided in TABLE 1.

TABLE 1

| Layer | Input | Output |
| --- | --- | --- |
| Res (A) | (H, W, C) | (H, W, A) |
| Res (A) | (H, W, A) | (H, W, A) |
| Max Pool | (H, W, A) | (H/2, W/2, A) |
| Res (B) | (H/2, W/2, A) | (H/2, W/2, B) |
| Res (B) | (H/2, W/2, B) | (H/2, W/2, B) |
| Max Pool | (H/2, W/2, B) | (H/4, W/4, B) |

Both the first level encoder and the second level encoder consider input of dimension (H,W,C) to produce the output of (H/4,W/4,B). The (H,W,C) values for the Encoder-1 and the Encoder-2 are (256,256,32) and (64,64,128) respectively. The (A,B) values for the Encoder-1 and the Encoder-2 are (32,64) and (128,256), respectively. In TABLE 1, Res (X) corresponds to 3-layer residual block with X filters, as in one of the literatures in the art. Before the Encoder-1, one Convolutional layer is used as stem with 32 filters.

After getting the set of structural and image information, the concatenating the image feature embedding and the edge feature embedding to generate the concatenated feature embedding that provides total information of the fashion apparel in the input image. Encoding process captures all the important cues which should be used to synthesize new image. Hence, concatenation provides with all the information of the fashion apparel necessary for effective synthesis. Further, the target style embedding of the fashion apparel is generated by processing the concatenated feature embedding via the second level encoder. The target style embedding captures high-level complex features, representative of the overall style information present in the input image.

At step 206 of the method 200, the one or more hardware processors 104 generate a target color embedding from the RGB components of the target color via multi-layer Fully Connected (FC) layers of the FAR-GAN. Existing recoloring methods either consider a color palette, color mask or histogram to control the color. However, these methods, change the color scheme of the entire image without focusing on a single object, such as the fashion apparel herein. Some existing methods incorporate complex multi-step operations, such as segmentation, color transformer network and paired discriminator to perform the task. Contrary to this, the method 200 provides a target color embedding branch to create the color embedding for manipulating the encoded style features in the decoder. This makes the overall architecture simple and easy to control. In this network branch. Normalized RGB components of the target color are provided as an input comprising a color vector that is passed on through eight dense layers, each of dimension 128 to create a non-linear target color embedding. To impose non-linearity, a Leaky ReLU activation function known in the art is used. After the dense operation, a 128-dimension target color embedding is obtained which is used in the decoder for color feature manipulation.

At step 208 of the method 200, the one or more hardware processors 104 generate, via the decoder of the FAR-GAN, the synthetic target image comprising the color variant of the fashion apparel. The decoder enables dictating of the target style embedding by the target color embedding using an Adaptive Instance Normalization (AdaIN) impose variability and utilizes un-correlated Gaussian noise added to each of the plurality of decoder blocks to impose variability in a color and a style of the fashion apparel in the synthetic target image enabling the object in the synthetic target image to appear realistic when displayed on a display screen of the system 100. For example, if a red color is provided as the target color, the Gaussian noise enables creating different shades of red so that the synthesized product looks realistic. Also, the gaussian noise generates minor changes in appearance to make the product realistic.

Figure 3:
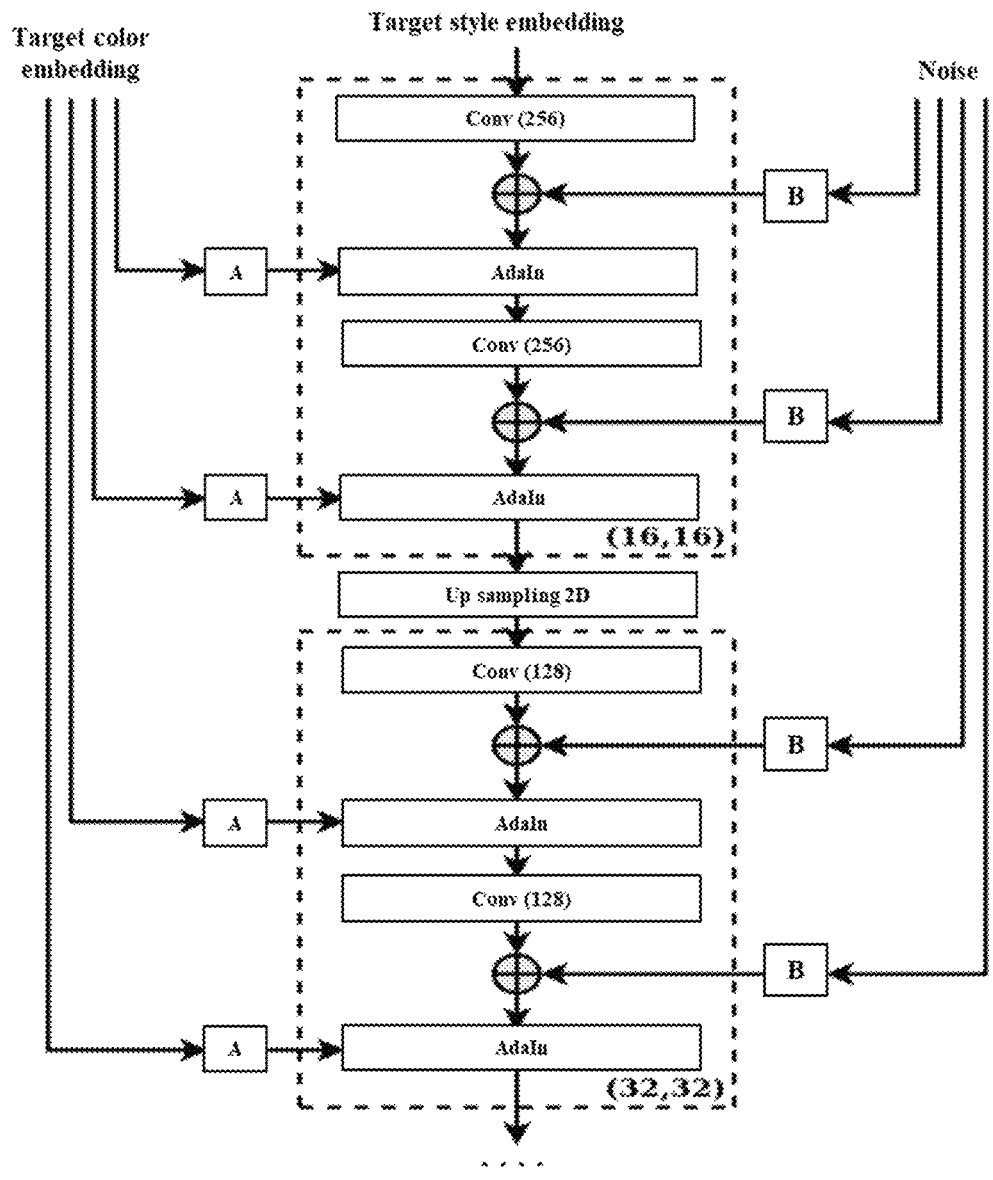
FIG. 3 depicts the block diagram of a decoder of the system of FIG. 1B to generate a color variant of a fashion apparel received in an input image in accordance with some embodiments of the present disclosure.

FIG. 3 depicts the block diagram of the decoder of the system 100 to generate the color variant of the fashion apparel received in the input image in accordance with some embodiments of the present disclosure. The target color embedding vector is responsible to alter the properties of the target style embedding obtained from the encoder-2 of the FAR-GAN. The decoder considers both the target style and color embedding and produces the synthetic target image with desired color in a bottom-up approach. The decoder consists of five decoder blocks, two of which are depicted in FIG. 3. These blocks are interconnected through the up sampling layers that increases the spatial resolution by a factor of 2. Inside the decoder, the color representation influences the style representation of the product by changing the color of synthesized apparel. The color representation vector first undergoes through a learned affine transformation to generate scaling and bias factors across the channel of the style representation. This is followed by the AdaIN, known in the art, which normalizes each channel and applies bias and scaling factor, depending on the color embedding vector. This operation alters the importance of the style features for subsequent operation dictated by the color embedding.

The operation can be given as follows:

$$AdaIN\ (x, c_s, c_b) = c_s \frac{x - \mu(x)}{\sigma(x)} + c_b \quad (1)$$

where, $\mu$, $\sigma$, x, $c_x$, and $c_b$ are mean operation, standard deviation operation, output of encoder, scaling, and bias factor of color embedding, respectively. Also, to impose variability, the un-correlated Gaussian noise is provided to the decoder. For all the decoder blocks, the noise is added for all feature maps with different spatial resolutions following a learned per-feature scaling factor. As depicted in FIG. 3, the decoder of the FAR-GAN consists of two Convolutional (Conv) and AdaIN layers. Here, "A" is a learned affine transform and "B" is a learned noise scaling factor. The last block does not contain up sampling layer and the number of filters in the final Conv layer in the decoder is 3.

Further, the one or more hardware processors 104, via the discriminator of the FAR-GAN depicted in FIG. 1B, determine whether the synthetic target image is a realistic or a non-realistic image by comparing with the input image. The FAR-GAN is trained on an adversarial loss to continuously enhance the synthetic target image. The Color Consistency Loss (CCL) of the FAR-GAN enables to explicitly control color information and penalize the FAR-GAN until a color of the synthetic target image is similar to the target color, wherein the CCL utilizes a cost function $L_2$ which is a function of the target color and a dominant color in the synthetic target image.

The overall FAR-GAN architecture is composed of encoder-decoder architecture as generator and ResNet-50, known in the art as the discriminator as depicted in FIG. 1B The discriminator also takes the conditional information with the query image and makes the decision if the synthesized image is realistic or not. A GAN model of the FAR-GAN is trained on the adversarial loss. Moreover, to explicitly control the color information and penalize the model with the generation of images with wrong color, the CCL is provided. The dominant color is extracted from the generated image (synthetic target image), and the FAR-GAN is configured to bring value of the dominant color closer to the target color value using an L2 cost function. The CCL is represented in equation below.

$$CCL(col_{target}, im_{sync}) = L_2(col_{target}, Dom(im_{sync})) \quad (2)$$

where CCL, $col_{target}$, $L_2$, $im_{sync}$ and Dom represent color consistency loss, target color, synthesized image, L2 loss and function to extract dominant color, respectively.

Figure 4:
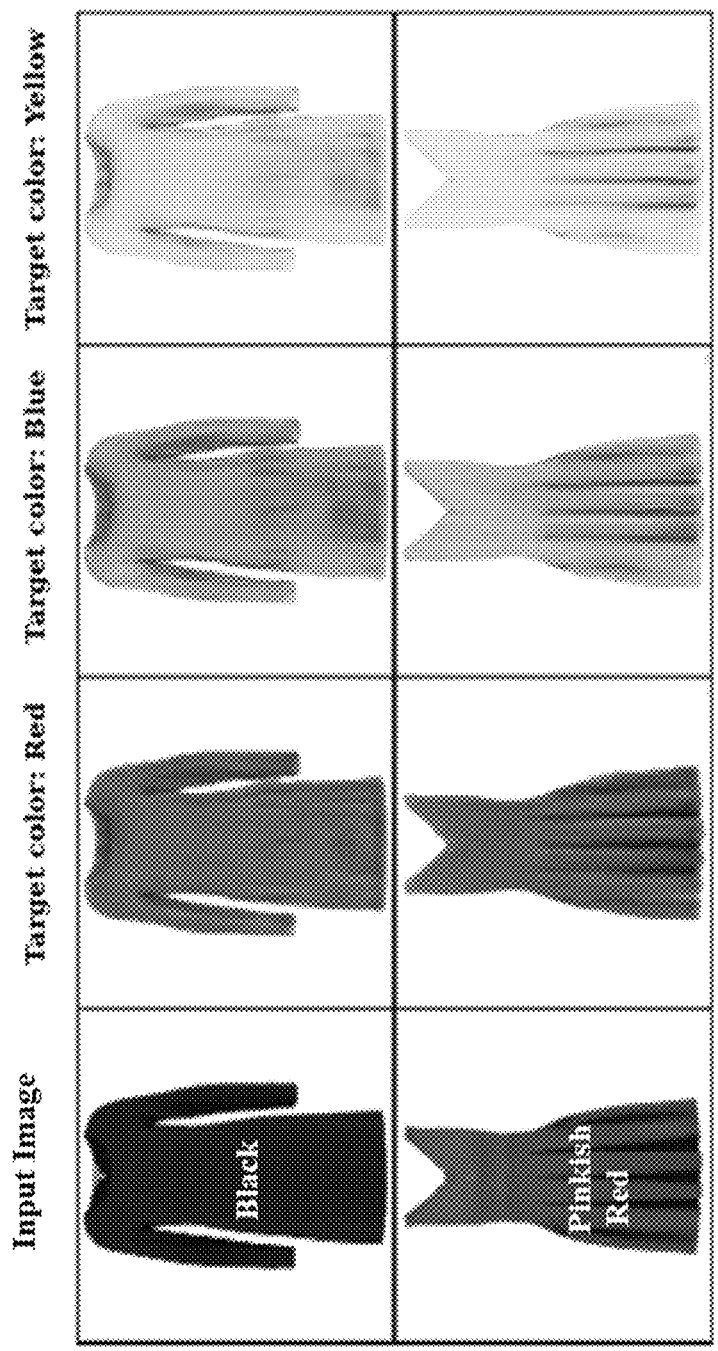
FIG. 4 depicts a plurality of color variant of a fashion apparel generated at output by the system of FIG. 11B, in accordance with some embodiments of the present disclosure.

FIG. 4 depicts a plurality of color variant of a fashion apparel generated at output by the system of FIG. 1B, in accordance with some embodiments of the present disclosure. First column contains the input images, alternatively also referred to as query images from Zalando dataset and next three columns demonstrate the synthetic images generated by FAR-GAN on the target color given in top of Rows 2-4. It can be understood that due to limitation of using only black and white drawings, greyed images of the original colored output synthetic target images are depicted with color specified using names of the colors. Similar explanation hold for experimental results of FIG. 5.

EXPERIMENTAL RESULTS: For experimentation, two datasets: Zalando and Shopping100k public datasets accessible to researchers are considered. 440 images from Zalando dataset, and 400 images from Shopping100k belonging to red, green, blue, and yellow colors have been selected for experimentation. For every image, four target colors, viz. red, green, yellow, and blue; are considered, thereby the training samples increase by four times. To demonstrate the performance of the AR-GAN with the state-of-the-art methodologies, results are compared with cGAN, StyleGAN, Pix2Pix, BiCycleGAN, and PaletteNet. To ensure fairness, all these methods are trained from scratch using both the datasets used by us. For training and evaluation, Fr'echet Inception Distance (FID) is considered to evaluate the quality of generated image, F1-score between the query and generated edge maps and Mean-Squared Error (MSE) between target and the dominant color of generated image. The FID is considered over inception score (IS) since it considers the distribution of both real and generated images, whereas IS considers only the distribution of generated images. Also, since FID finds the distance, lower value of FID is better. For F1-score and MSE, higher and lower values are better, respectively.

Results on Zalando dataset: Using the Zalando dataset, we have first performed a set of experiments to observe the most suitable image dimension for fashion apparel recoloring. For this, image dimension of 192, 224 and 256 is considered. These results are given in TABLE 2. From the results, it can be observed that although the model trained with image dimension 224 gives better FID than the model trained with image dimension 256, other two performance metrics are better for the latter model. Hence, image dimension of 256 is chosen for all future experimentation.

TABLE 2

| Image dimension | FID | F1-Score | MSE |
|---|---|---|---|
| (192, 192, 3) | 135.95 | 0.2033 | 0.0340 |
| (224, 224, 3) | 63.77 | 0.2064 | 0.0445 |
| (256, 256, 3) | 78.95 | 0.2094 | 0.0278 |

In TABLE 3, the performance of the FAR-GAN is compared with the state-of-the-art methods. Note that, since StyleGAN and BiCycleGAN do not possess edge, color control and color control respectively, the values are left blank for corresponding places in TABLES 3 and 4. For comparison, three variations are considered for the result from the method, viz.: (1) the model trained from scratch with the Zalando dataset; (2) result obtained by evaluating the model trained with Shopping100k dataset; and (3) result obtained by fine-tuning the model trained with Shopping100k dataset. From the experimental results, it is observed that although the method disclosed gives comparable performance for F1-score (0.2094 compared to 0.2159 in Conditional GAN, it outperforms all other methods in art by a significant margin for FID (78.95 compared to 97.37 in c and MSE (0.0278 compared to 0.3149 in Pix2Pix).

These results hence show the superiority of method disclosed.

TABLE 3

| Model | FID | F1-Score | MSE |
|---|---|---|---|
| Conditional GAN | 156.94 | 0.2159 | 0.3298 |
| StyleGAN | 359.75 | N.A. | N.A. |
| Pix2Pix | 97.37 | 0.2005 | 0.3149 |
| BiCycleGAN | 182.77 | 0.2041 | N.A. |
| PaletteNet | 189.20 | 0.2155 | 0.3631 |
| FAR-GAN (trained from scratch) | 78.95 | 0.2094 | 0.0278 |
| FAR-GAN (evaluated on Shopping 100k model) | 129.48 | 0.1975 | 0.1783 |
| FAR-GAN (fine-tuned on Shopping 100k model) | 153.19 | 0.1941 | 0.1403 |

Results on Shopping100k dataset: Using the experimental protocol employed in Zalando dataset experiments, further experiments are performed on the dataset curated from Shopping100k. In TABLE 4, the performance of the method disclosed utilizing the FAR-GAN is compared with the state-of-the-art methods.

TABLE 4

| Model | FID | F1-Score | MSE |
|---|---|---|---|
| Conditional GAN | 425.06 | 0.2287 | 0.4451 |
| StyleGAN | 435.44 | N.A. | N.A. |
| Pix2Pix | 96.39 | 0.2191 | 0.3557 |
| BiCycleGAN | 184.32 | 0.2188 | N.A. |
| PaletteNet | 77.66 | 0.2168 | 0.4125 |
| FAR-GAN (trained from scratch) | 72.76 | 0.2246 | 0.1745 |
| FAR-GAN (evaluated on Zalando model) | 87.81 | 0.2219 | 0.3271 |
| FAR-GAN (fine-tuned on Zalando model) | 165.25 | 0.2163 | 0.1834 |

Figure 5:
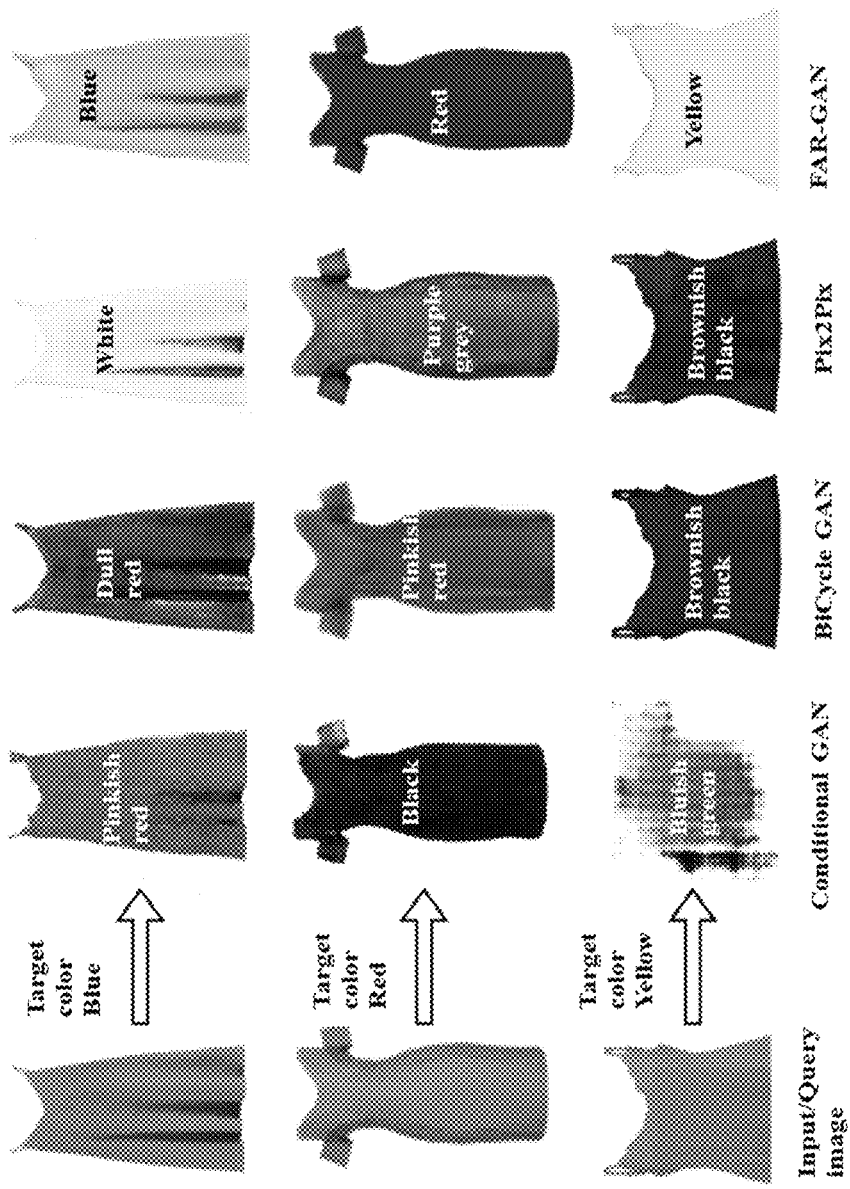
FIG. 5 depicts comparative analysis of color variant outputs generated by the system of FIG. 1B with state of the art techniques, in accordance with some embodiments of the present disclosure.

For comparison, three variations are considered for the result from the FAR-GAN, as followed in TABLE 3. From the experimental results, it indicates similar trend as being observed in TABLE 3. The FAR-GAN here gives comparable performance for F1-score (0.2246 compared to 0.2287 in conditional GAN), it outperforms all other existing methods by a large margin for FID (72.76 compared to 77.66 in PaletteNet) and MSE (0.1745 compared to 0.3557 in Pix2Pix). FIG. 5 depicts comparative analysis of color variant outputs generated by the system of FIG. 1B with state of the art techniques, in accordance with some embodiments of the present disclosure. Comparison of the visual results of the FAR-GAN disclosed herein, with several baseline methods, such as cGAN, BiCycle-GAN and Pix2Pix is depicted. The first two input images (query images) are from Zalando dataset, and the last image is from Shopping100k dataset. The results show that the FAR-GAN based method obtains better color control and reconstruction.

Ablation Study: To validate the impact of the design decisions on the overall fashion apparel regeneration with color variants, an extensive set of ablation study experiments are conducted. Firstly, to understand the reason for incorporating a two-step encoding process, first the Encoder-1 is replaced by a single Conv layer and one max pooling layer and then replaced the Encoder-2 by the same. Secondly, to explain the importance of edge information, the edge feature extraction part is removed. Thirdly, the impact of color information is evaluated by first removing the color embedding part and then removing the color consistency loss component. Also, we experimented by incorporating the edge consistency loss, similar to the color consistency loss to justify its absence in the FARGAN. From the ablation study experiments shown in TABLE 5, the following points are observed: (1) removal of Encoder-1 and Encoder-2 result in poor quality of synthesized image, although color and structural information doesn't harm significantly; (2) removing color embedding and color consistency loss results in very high MSE loss due to the lost control in color, which results in giving poor performance for FID as well; (3) removing edge embedding part creates poorly rendered images, reflected in the high FID score; and (4) there is no additional benefit obtained with edge consistency loss, however, the color error increases with this. With these results, the design choices for the FAR-GAN are justified.

TABLE 5

| Experiments | FID | F1-Score | MSE |
| --- | --- | --- | --- |
| Removing Encoder-1 | 133.92 | 0.2052 | 0.0581 |
| Removing Encoder-2 | 115.75 | | |
| Removing edge embedding part | 192.84 | 0.2048 | 0.0671 |
| Removing color embedding part | 263.40 | 0.2065 | 0.2420 |
| Removing color consistency loss | 133.65 | 0.2082 | 0.2802 |
| Adding edge consistency loss | 128.07 | 0.2033 | 0.2799 |
| FAR-GAN (trained from scratch) | 78.95 | 0.2094 | 0.0278 |
| FAR-GAN (evaluated on Shopping 100k model) | 129.48 | 0.1975 | 0.1783 |
| FAR-GAN (fine-tuned on Shopping 100k model) | 153.19 | 0.1941 | 0.1403 |

The method disclosed herein is explained in context of generating color variants for fashion apparels. However, in an embodiment the method can be equally applicable to generating color variants of any object other than fashion apparels with minimal modifications as understood by person skilled in the art, still being within the scope of the method disclosed.

In another embodiment, if the input image comprises more than one fashion apparels, the method disclosed herein can additionally apply bounding box or segmentation techniques known in the art to segregate each fashion apparel and then process to generate and display the color variant for each fashion apparel.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for generating color variants for fashion apparels, the method comprising:
receiving, via one or more hardware processors, (a) an input image comprising a fashion apparel, and (b) a target color for generating a color variant of the fashion apparel, wherein the target color is represented in terms of Red Blue Green (RGB) components;
generating, via a two-step encoder of a Fashion Apparel Regeneration-Generative Adversarial Network (FAR-GAN) executed by the one or more hardware processors, a target style embedding of the fashion apparel by processing the input image, the two-step encoder comprising (a) a first level encoder generating a concatenated feature embedding representing a plurality of primary low-level features and an edge map of the fashion apparel and (b) a second level encoder generating the target style embedding from the concatenated feature embedding;

generating, via the one or more hardware processors, a target color embedding from the RGB components of the target color via multi-layer Fully Connected (FC) layers of the FAR-GAN; and generating, via a decoder of the FAR-GAN executed by the one or more hardware processors, a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen.

2. The method of claim 1, further comprising a discriminator connected to the decoder to determine whether the synthetic target image is a realistic or a non-realistic image by comparing the synthetic target image with the input image, wherein the FAR-GAN is trained on an adversarial loss to continuously enhance the synthetic target image.

3. The method of claim 1, further comprising use of a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image.

4. The method of claim 1, wherein generating the target style embedding comprising:
  extracting the plurality of primary low-level features of the fashion apparel via a first encoder of the first level encoder to generate an image feature embedding;
  generating the edge map of the fashion apparel via a pre-trained Cycle GAN;
  generating, via a second encoder of the first level encoder, an edge feature embedding from the edge map;
  concatenating the image feature embedding and the edge feature embedding to generate the concatenated feature embedding; and
  generating the target style embedding of the fashion apparel by processing the concatenated feature embedding via the second level encoder.

5. A system for generating color variants for fashion apparels, the system comprising:
  a memory storing instructions;
  one or more Input/Output (I/O) interfaces; and
  one or more hardware processors coupled to the memory via the one or more I/O interfaces, the memory comprising a Fashion Apparel Regeneration-Generative Adversarial Network (FAR-GAN) executed by the one or more hardware processors is configured by the instructions to:
    receive (a) an input image comprising a fashion apparel, and (b) a target color for generating a color variant of the fashion apparel, wherein the target color is represented in terms of Red Blue Green (RGB) components;
    generate via a two-step encoder of the FAR-GAN, a target style embedding of the fashion apparel by processing the input image, the two-step encoder comprising (a) a first level encoder generating a concatenated feature embedding representing a plurality of primary low-level features and an edge map of the fashion apparel and (b) a second level encoder generating the target style embedding from the concatenated feature embedding;
    generate a target color embedding from the RGB components of the target color via multi-layer Fully Connected (FC) layers of the FAR-GAN; and
    generate via a decoder of the FAR-GAN, a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen.

6. The system of claim 5, wherein the FAR-GAN via a discriminator connected to the decoder is configured to determine whether the synthetic target image is a realistic or a non-realistic image by comparing the synthetic target image with the input image, wherein the FAR-GAN is trained on an adversarial loss to continuously enhance the synthetic target image.

7. The system of claim 5, wherein the FAR-GAN via is configured to utilize of a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image.

8. The system of claim 5, wherein the FAR-GAN is configured to generate the target style embedding by:
  extracting the plurality of primary low-level features of the fashion apparel via a first encoder of the first level encoder to generate an image feature embedding;
  generating the edge map of the fashion apparel via a pre-trained Cycle GAN;
  generating, via a second encoder of the first level encoder, an edge feature embedding from the edge map;
  concatenating the image feature embedding and the edge feature embedding to generate the concatenated feature embedding; and
  generating the target style embedding of the fashion apparel by processing the concatenated feature embedding via the second level encoder.

9. One or more non-transitory machine-readable information storage mediums comprising one or more instructions which when executed by one or more hardware processors cause:
  receiving, (a) an input image comprising a fashion apparel, and (b) a target color for generating a color variant of the fashion apparel, wherein the target color is represented in terms of Red Blue Green (RGB) components;
  generating, via a two-step encoder of a Fashion Apparel Regeneration-Generative Adversarial Network (FAR-GAN) executed by the one or more hardware processors, a target style embedding of the fashion apparel by processing the input image, the two-step encoder comprising (a) a first level encoder generating a concatenated feature embedding representing a plurality of primary low-level features and an edge map of the fashion apparel and (b) a second level encoder generating the target style embedding from the concatenated feature embedding;
  generating a target color embedding from the RGB components of the target color via multi-layer Fully Connected (FC) layers of the FAR-GAN; and generating, via a decoder of the FAR-GAN executed by the one or more hardware processors, a synthetic target image comprising the color variant of the fashion apparel, wherein the decoder dictates the target style embedding by the target color embedding using an Adaptive Instance Normalization (AdaIN) and utilizes un-correlated Gaussian noise added to each of the plurality of decoder blocks to impose variability in a color and a style of the fashion apparel in the synthetic target image enabling the synthetic target image to appear realistic when displayed on a display screen.

10. The one or more non-transitory machine-readable information storage mediums of claim 9, wherein the one or more instructions which when executed by the one or more hardware processors further cause use of a Color Consistency Loss (CCL) to explicitly control color information and penalize the FAR-GAN until a color of the synthetic target image is similar to the target color, wherein the CCL utilizes a cost function $L_2$ which is a function of the target color and a dominant color in the synthetic target image.

11. The one or more non-transitory machine-readable information storage mediums of claim 9, wherein the one or more instructions which when executed by the one or more hardware processors further cause:

extracting the plurality of primary low-level features of the fashion apparel via a first encoder of the first level encoder to generate an image feature embedding;

generating the edge map of the fashion apparel via a pre-trained Cycle GAN;

generating, via a second encoder of the first level encoder, an edge feature embedding from the edge map;

concatenating the image feature embedding and the edge feature embedding to generate the concatenated feature embedding; and generating the target style embedding of the fashion apparel by processing the concatenated feature embedding via the second level encoder.

* * * * *